Dec. 23, 1958  W. HERBST ET AL  2,866,154
HIGH VOLTAGE TESTING APPARATUS
Filed March 2, 1955
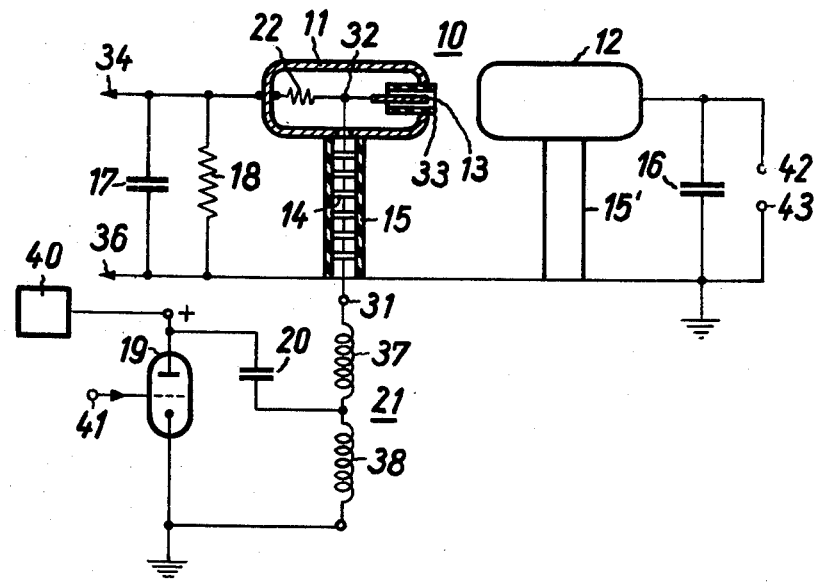
Inventor:
Wolfgang Herbst and
Carl Blömeke
by: Michael S. Striker

United States Patent Office 2,866,154
Patented Dec. 23, 1958

2,866,154

HIGH VOLTAGE TESTING APPARATUS

Wolfgang Herbst and Carl Blömeke, Kassel, Germany, assignors to Licentia Patent-Verwaltungs-G. m. b. H., Hamburg, Germany Application March 2, 1955, Serial No. 491,590

2 Claims. (Cl. 324—28)

The present invention relates to high voltage testing apparatus. More particularly the present invention relates to an improvement in high voltage testing apparatus using a controllable spark gap for applying the high voltage.

In many high voltage and high current test procedures in use today, it is common to have separate high current and high voltage sources. The material being tested is usually first tested for its current-carrying capacity and then after the current source has been removed, the high voltage is applied across the material under test.

For example, such an arrangement is used for testing power switches. The high current is passed through the power switch in its closed position so that its interrupting ability is tested. When the current through the closed switch reaches its zero value the switch is opened and the high voltage is applied thereacross. This high voltage usually corresponds to the normal recovery voltage received by the switch under conditions of short circuit in actual operation.

In such testing arrangements, controllable spark gaps may be used for the application of the high voltage to the material under test. That is, the spark gap is used as a switch which is closed at the desired time for the application of the high voltage. In order to initiate a discharge across the electrodes of the spark gap at the proper time, one or more auxiliary starting electrodes can be used. A high voltage impulse is applied to the starting electrode to initiate a discharge between the starting electrode and one of the two main electrodes of the spark gap. This initial discharge between the main electrode and the starting electrode then causes a discharge between the two main electrodes of the spark gap.

There are several ways for applying the starting impulse to the auxiliary starting electrode. One method is to use a high voltage transformer whose output applies the high voltage to the starting electrode. In such a case, it is apparent that the output of the transformer must be insulated for the full amount of the high voltage applied across the spark gap. There are also optical methods which might be used to provide the proper starting impulse.

It is clear that either of the above-outlined methods requires expensive and complicated apparatus. On the other hand, apparatus incorporating the principles of the present invention carries out the same function using inexpensive equipment and without requiring the high voltage insulation normally needed for the starting impulse generating equipment.

Accordingly, it is an object of the present invention to provide a new and improved high voltage testing apparatus.

Another object of the present invention is to provide a new and improved high voltage testing apparatus using a spark gap for application of the high voltage.

A further object of the present invention is to provide a new and improved apparatus for initiating a discharge between the main electrodes of a spark gap.

Yet another object of the present invention is to provide a new and improved apparatus for initiating a discharge between the main electrodes of a spark gap wherein the high voltage starting impulse is applied through a capacitive impedance to the auxiliary starting electrode.

With the above objects in view, the present invention mainly consists in a high voltage testing apparatus having an input and an output, in combination, a spark gap having a first and a second main electrode connected between the input and the output so that a high voltage applied to the input will be applied to the output whenever a discharge occurs between the main electrodes, an auxiliary starting electrode arranged closer to the first electrode than to the second electrode, means for generating a high voltage starting impulse, and a capacitive impedance connected between the generator means and the auxiliary electrode for applying the starting impulse to the starting electrode whereby the application of the high voltage starting impulse to the auxiliary electrode initiates a discharge between the main electrodes of the spark gap.

The novel features which are considered as characteristic for the invention are set forth in particular in the appending claims. The invention itself, however, both as to its construction and its method of operation, together with additional objects and advantages thereof, will be best understood from the following description of specific embodiments when read in connection with the accompanying drawing, which is a schematic diagram of a preferred embodiment of apparatus capable of carrying out the present invention.

Referring now to the drawing it can be seen that the apparatus includes a spark gap 10 having a first main electrode 11 and a second main electrode 12. The main electrodes 11 and 12 are insulated from ground by insulators 15 and 15' respectively. Insulator 15 is shown in cross-section so that it can be seen that it has a hollow interior.

Connected within the hollow insulator 15 is a plurality of capacitors 14 which are all connected in series between a first terminal 31 and a second terminal 32. Also connected to the terminal 32 is an auxiliary starting pin electrode 13 which is mounted close to the main electrode 11. It is clear that the auxiliary electrode 13 is insulated from electrode 11 by means of an insulating tube 33.

Connected between the terminal 32 and the main electrode 11 is a resistor 22 which preferably has a substantially high resistance. Also connected to the main electrode 11 is one side of the parellel combination of capacitor 17 and resistor 18, the other side of which is connected to ground. This parallel combination is also connected between the output terminals 34 and 36.

Connected to the terminal 31 is one side of the output winding 37 of an autotransformer 21. The input winding 38 of the autotransformer has one of its ends connected to ground and its other end connected to one side of a capacitor 20. The other side of the capacitor 20 is connected to the anode of a thyratron 19 and to a source of positive potential 40. The thyratron 19 also includes a cathode connected to ground and a control electrode connected to an input terminal 41.

The remaining component of the apparatus includes a capacitor 16 which is connected between the main electrode 12 and ground. Also connected across the capacitor 16 is a pair of input terminals 42 and 43 respectively.

In operation, the source for the high voltage which is to be applied to the apparatus under test is connected across the input terminals 42 and 43. This high voltage is to be applied across the output terminals 34 and 36 at some predetermined time. It can be seen that when a discharge occurs between the main electrodes 11 and 12 the voltage applied across the input terminals 42 and 43 will be applied directly across the output terminals 34 and 36.

When the voltage applied across the input terminals 42 and 43 is a direct-current voltage, the capacitor 16 will be charged thereby and remain charged until a discharge occurs between the main electrodes 11 and 12. The output terminals 34 and 36 are adapted to be connected across the material to be tested and may include a high voltage oscillatory circuit. In the latter event the capacitor 17 may cooperate with an inductor (not shown) to provide the proper high voltage oscillatory circuit.

The thyratron 19 and the autotransformer 21 function as an impulse generator for initiating the discharge between the main electrode 11 and 12. As is known from the operation of the thyratron, the potentials on the thyratron 19 may be pre-arranged so that the thyratron will not conduct until the potential of the control electrode thereof reaches a predetermined positive level. Therefore, in its normal state the power supply 40 will charge the capacitor 20. When the potential of the control electrode of the thyratron 19 reaches the predetermined level, the thyratron will start to conduct and provide a discharge path for the capacitor 20.

When the capacitor 20 discharges through the conducting thyratron 19, this discharging pulse is applied to the input winding 38 of the autotransformer 21. The application of the pulse to the input winding 38 induces a high voltage output pulse in the output winding 37 which is applied to the terminal 31.

From the terminal 31 this high voltage impulse which has been generated by the impulse generating circuit, is applied to the starting electrode 13 through the series capacitors 14. The application of the high voltage impulse to the auxiliary starting electrode 13 causes an initial discharge to occur between the electrode 13 and the main electrode 11. This initial discharge shortens the effective conductive path between the main electrodes 11 and 12 of the spark gap 10 resulting in a discharge between the main electrodes 11 and 12.

The discharge of the spark gap immediately causes the voltage applied to the input terminals 42 and 43 to be applied across the output terminals 34 and 36 and the illustrated apparatus has carried out its function.

Accordingly, by the above-described method, it is possible to synchronize the discharge of the spark gap 10 with the conditions of the current flowing through the material on the test. This synchronization can easily be accomplished for example by use of a current transformer in the current testing circuit from which a positive pulse is derived at a desired instant and is applied to the control electrode of the thyratron 19. This will immediately cause an impulse to be generated which is applied through the capacitors 14 to the starting electrode 13.

It can be seen from the above arrangement that it is not necessary to provide a very high voltage insulation for the autotransformer 21. It is merely necessary to provide a sufficient insulation for the protection of this transformer from the voltage of the generated impulse. It should be clear that the voltage of the generated impulse is substantially lower than the total voltage applied between the electrodes 11 and 12.

In the figure the capacitors are shown mounted within the insulator 15 for the electrode 11. It should be clear that these capacitors can actually be used as the insulator for the electrode 11 rather than being mounted therein.

The resistor 22 carries out the function of a leakage resistor for preventing undesired breakdowns between the auxiliary electrode 13 and the main electrode 11. In this event the parallel combination of the capacitor 17 and the resistor 18 provide a return path for the impulse circuit.

It will be understood that each of the elements described above, or two or more together, may also find a useful application in other types of high voltage apparatus differing from the types described above.

While the invention has been illustrated and described as embodied in high voltage testing apparatus, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A spark gap arrangement for use in high voltage testing apparatus comprising, in combination, at least one main electrode; a rod-shaped auxiliary igniting electrode arranged within said main electrode and insulated therefrom, said igniting electrode being adapted to produce a discharge between the same and said main electrode upon application of an igniting impulse to said igniting electrode; an insulating shaft supporting said main and igniting electrodes and insulating the same from ground potential; control means connected to ground potential for generating said igniting impulse; and capacitor means connected in circuit between said control means and said igniting electrode and mounted in said insulating shaft for transmitting an igniting pulse from said control means to said igniting electrode.

2. A spark gap arrangement for use in high voltage testing apparatus comprising, in combination, at least one main electrode; a rod-shaped auxiliary igniting electrode arranged within said main electrode and insulated therefrom, said igniting electrode being adapted to produce a discharge between the same and said main electrode upon application of an igniting impulse to said igniting electrode; hollow insulating means supporting said main and igniting electrodes and insulating the same from ground potential; control means connected to ground potential for generating said igniting impulse; and capacitor means connected in circuit between said control means and said igniting electrode and arranged within said insulating means for transmitting an igniting pulse from said control means to said igniting electrode.

References Cited in the file of this patent

UNITED STATES PATENTS

| | | |
|---|---|---|
| 2,230,730 | Skeats | Feb. 4, 1941 |
| 2,508,954 | Latour et al. | May 23, 1950 |
| 2,728,886 | Rohats | Dec. 27, 1955 |